UNITED STATES PATENT OFFICE.

AUGUSTE J. ROSSI AND LOUIS E. BARTON, OF NIAGARA FALLS, NEW YORK, ASSIGNORS TO THE TITANIUM ALLOY MANUFACTURING COMPANY, OF NEW YORK, N. Y., A CORPORATION OF MAINE.

TITANIUM COMPOUND.

1,196,031.   Specification of Letters Patent.   Patented Aug. 29, 1916.

No Drawing.   Application filed February 10, 1916.   Serial No. 77,469.

*To all whom it may concern:*

Be it known that we, AUGUSTE J. ROSSI and LOUIS E. BARTON, both citizens of the United States, and residents of Niagara Falls, in the county of Niagara and State of New York, have jointly invented a certain new and useful Titanium Compound, of which the following is a specification.

Our present invention relates to the production of a new composition of matter, from materials containing preferably high percentages of titanic acid, our said novel product, being, when dried, an amorphous powder consisting essentially, we believe, of a titanium sulfate, or sulfates, combined with hydrated titanic acid, and, as such, utilizable in various arts, and also, particularly, for extraction therefrom of a titanic oxid product of superior purity and novel characteristics.

Our said new article, or composition, we believe to be essentially a basic sulfate of titanium. It is characterized as containing, by analysis, a great preponderance of titanic oxid, say in the neighborhood of from 70% to 80%, as containing also less combined water than said titanic oxid, say in the neighborhood of from 15% to 20%, and as containing less combined sulfuric anhydrid than said water, say in the neighborhood of from 5% to 10%. It is, as produced by our hereinafter described method, also characterized as being in very finely divided or powdered state, when dried; as pure white in color, and as of comparatively low specific gravity, *i. e.* about 2.60. It is also characterized as yielding, on calcination, a particularly pure and desirable titanic oxid concentrate, this being in the form of an exceedingly fine powder, and, as compared to titanic oxids produced, or concentrated, by other methods, of very soft and smooth texture, and of lower specific gravity. Such previously obtained titanic oxid products, for example "orthotitanic" acids, derived by aid of alkali precipitation of acid solutions, result, when dried and calcined, in very hard, horny and dense masses; also titanic acids such as "meta-titanic acids", derived through precipitation from acid solutions of titanium, such as titanium chlorid and titanium sulfate, diluted with water and boiled, when dried and calcined, are in the form of coarse gritty powder.

We have discovered that our said basic titanium sulfate product is producible from any ore, or other substance, containing titanic oxid entangled with undesired elements and compounds, for example from so-called "titaniferous iron ores", but it is preferably, and most economically, applicable to substances, including ores, which contain preponderance, or relatively high percentages, of titanic oxid, such for example as are designated "rutile", the which ores contain sometimes as high as 93% of titanic oxid besides, therewith commingled, oxids of iron and constituents of gangue.

In our copending applications for Letters Patent Serial No. 733,943, filed November 29, 1912, and Serial No. 13,478, filed March 10, 1915, we have disclosed and are claiming methods whereby our said novel titanic product is producible, one of which methods is, for example, as follows: Although we can utilize as the initial material any titaniferous material capable of being brought into sulfuric acid solution as for example, titaniferous iron ore, or ilmenite, etc., or the slag resulting from fusion of such ore, or ilmenite, with alkali compounds, we prefer to use, on account of its comparative freedom from objectionable impurities, and also because of its ready solubility in sulfuric acid, the dried, uncalcined, products of our methods for concentrating titanic oxid for which were granted to us, on August 11, 1914, Letters Patent Nos. 1,106,409 and 1,106,410, or for which is still pending our application for patent Serial Number 840,197, filed May 22, 1914. One or more of the materials, or products, thus referred to, we then digest at preferably a temperature of 100° to 150° C. in an iron, or other suitable vessel, with say 95% sulfuric acid in the proportion of 2.5 to 2.6 parts by weight of the acid to one part of titanic oxid in the material to be digested. This digestion we continue until a sample taken from the digester shows, by analysis, a nearly complete combination of the sulfuric acid with the bases. Under these conditions we expect 85% to 95% of the titanic oxid in the charge to be combined with sulfuric acid as titanic sulfate. We then place the mass in a lead-lined, or other suitable, vessel and dissolve it in water of about three times the volume of the sulfuric acid used in the charge. The resulting solution is of suitable concentration for filtration from any undissolved residue and of convenient volume for storage. We expect it to contain about 11% of titanic oxid and little, or no, free sulfuric acid. It is, of course, preferable to filter the solution at this stage. To obtain our basic titanic sulfate from this solution, or filtrate, it is only necessary to dilute the latter until it contains from say .5% to 3.% of titanic oxid, and boil it from say fifteen to thirty minutes; but our basic titanic sulfate thus precipitated may, under certain conditions, be contaminated by a little iron oxid, i. e. more than may be desirable for some special uses of our product.

We are able to attain a better, i. e. purer product, though a lesser yield, by adding to the bath a considerable amount of free sulfuric acid, but this modification is not usually desirable on account of cost.

We have also discovered that if the iron present in our said solution is, prior to the precipitation, reduced to the ferrous state, our basic titanic sulfate product will be practically free from iron. We resort to any convenient, well-known, manner of thus reducing the iron when so required, as, for example, by passing sulfuric dioxid gas into the solution; but we have most conveniently attained the desired result by resort to the well-known electrolytic reduction of the iron in a diaphragm cell, in which case we acidify our above described concentrated titanic sulfate solution so as to contain 1.5% to 2% of free sulfuric acid and thus use it as the catholyte, with which we use, as the anolyte, very dilute sulfuric acid, say about .5%, and pass the current only long enough to insure the complete reduction of the iron, which is indicated by development in the solution of a pale violet color showing presence of some titanous sulfate. The thus partially reduced solution we dilute, preferably to one tenth its original strength, so it will contain about 1.1% titanic oxid and about .15% to .2% of free sulfuric acid. The product precipitated by boiling as above described consists essentially of our basic titanic sulfate. This we filter out, wash it with water and dry it at about 100° C.

We have noted that our titanic solutions prepared as above described, lose, during the boiling, all, or nearly all, violet color, by, as we assume, atmospheric oxidation of their relatively small content of titanous sulfate. But such solutions containing much titanous sulfate, as would be the case if electrolytic reduction above described, was carried too far, or if the aforesaid product of the process of our said Patent No. 1,106,406 was employed, will retain their violet color even after extended boiling.

In such cases as the two last mentioned, we have found it useful to add to the solution an oxidizing agent such as chlorin, chlorates, persulfates, or, much preferably, nitric acid, in such quantity as to oxidize most, but not all, of the titanous to titanic sulfate, the proper quantity of the oxidizing agent to thus employ being readily determined from the quantity of titanous sulfate in solution as shown by analyses. But it should be particularly noted that the amount of oxidizing agent thus added should be, in every case, less in quantity than required to completely oxidize all the titanous sulfate, since some atmospheric oxidation will take place during the boiling, and the presence of at least some little titanous sulfate we find desirable in order to insure the retention of such iron as may be present in the ferrous state, which, as we have above indicated, is a condition indispensable if production of the purest possible precipitate product is desired.

The following table indicates the chemical composition of the novel product of our said process, as determined by analysis of four samples.

| | Sample No. | | | |
|---|---|---|---|---|
| | 230 | 330 | 338 | 341 |
| Titanic oxid, % | 70.78 | 75.01 | 76.37 | 73.36 |
| Sulfuric anhydrid | 9.85 | 5.38 | 8.40 | 8.81 |
| Combined water (diff.) | 19.37 | 19.61 | 15.23 | 17.83 |
| | 100.00 | 100.00 | 100.00 | 100.00 |

These results indicate that the composition of the product will vary a little depending on conditions of precipitation, particularly as regards titanic oxid and free-acid concentration of the solution; excessive dilution yielding products lower in sulfuric anhydrid, as witness, for example, No. 330 in the above table. The concentration may, however, vary between wide limits without much variation in percentage of sulfuric anhydrid in the product. Thus, in a series of experiments on this point, the results shown in the following table were obtained.

*Concentration of solution.*

| Test No. | Titanic oxid gram per liter. | Free sulfuric acid gram per liter. | Per cent. sulfuric anhydrid in product. |
|---|---|---|---|
| 1 | 16. | .00 | 9.18 |
| 2 | 6.4 | .00 | 7.82 |
| 3 | 5.2 | 28.4 | 9.38 |
| 4 | 4.3 | 28.2 | 9.04 |
| 5 | 3.5 | 18.8 | 8.40 |
| 6 | 2.1 | 14.1 | 7.29 |

The analyses before given indicate our product to be a chemical combination of a titanic sulfate with hydrated titanic oxid, that is to say, basic titanic sulfate.

We find in practice that the composition of our product may vary between certain definite limits substantially as follows: titanic oxid say 70% to 80%, sulfuric anhydrid 5% to 10%, combined water 15% to 20%.

We are aware that prior to our invention it was known that if titanic sulfate solution were evaporated to concentration, a normal titanic sulfate, $Ti(SO_4)_2.3H_2O$, might be obtained as a residual product; the same being a yellowish mass soluble in water: Also that if titanic sulfate solution were greatly diluted with water and the solution boiled, the titanium might be separated as a white precipitate of meta-titanic acid, $TiO_2.xH_2O$, insoluble in water. But, we have discovered that if titanic sulfate solutions with or without some free sulfuric acid present and of a concentration between that of the two cases mentioned, be boiled, there will be precipitated our, as we believe, novel titanium compound, to wit, basic titanic sulfate, of which consists essentially the final product of our above described novel procedures, and which is also characterizable as containing, by analysis, principally titanic oxid, less combined water than titanic oxid, and less sulfuric anhydrid than combined water, as being, when dried at about 100° C., a pure white powder, insoluble in water, and as having a specific gravity of about 2.60.

It will be understood that we do not confine ourselves to our said novel titanic product or article as produced by our, at present preferred, method hereinbefore specifically described, it being apparent to us that the said article is, and may be, producible by other methods.

Having now described our invention, what we claim as new and desire to secure by Letters Patent is the following, viz:

As a new product, the herein described titanium compound characterized as consisting essentially of basic titanium sulfate and as rendering by analysis a preponderance of titanic oxid, less combined water than titanic oxid, and less sulfuric anhydrid than combined water.

AUGUSTE J. ROSSI.
LOUIS E. BARTON.

Witnesses:
  C. J. KINZIE,
  WM. V. KNOWLES.